United States Patent
Robertson

(10) Patent No.: US 6,810,587 B1
(45) Date of Patent: Nov. 2, 2004

(54) COMBINED CLAMPING AND CUTTING TOOL FOR PLASTIC PIPES

(76) Inventor: Duane D. Robertson, 122 Loveland Way, Golden, CO (US) 80401

( * ) Notice: Subject to any disclaimer, the term of this patent is extended or adjusted under 35 U.S.C. 154(b) by 0 days.

(21) Appl. No.: 10/641,347

(22) Filed: Aug. 15, 2003

(51) Int. Cl.$^7$ ............................................. B23D 29/02
(52) U.S. Cl. ............................................. 30/96; 30/101
(58) Field of Search ............................ 30/96, 97, 101, 30/134, 135; 82/100

(56) References Cited

U.S. PATENT DOCUMENTS

| | | | |
|---|---|---|---|
| 784,445 A | | 3/1905 | Sylvester |
| 1,279,022 A | * | 9/1918 | Scott .............................. 30/96 |
| 1,727,225 A | * | 9/1929 | Acres, Jr. ...................... 30/96 |
| 2,162,210 A | | 6/1939 | Alston |
| 2,212,564 A | | 8/1940 | Hord |
| 3,932,937 A | | 1/1976 | Bastiansen |
| 4,305,205 A | | 12/1981 | Girala |
| 4,345,376 A | | 8/1982 | Benson et al. |
| 4,402,136 A | * | 9/1983 | Rast ............................. 30/101 |
| 4,739,554 A | | 4/1988 | Hytonen |
| 4,847,997 A | | 7/1989 | Petty |
| 4,858,316 A | | 8/1989 | Dubey |
| 5,033,153 A | | 7/1991 | Post |
| 5,461,955 A | | 10/1995 | Weisshaar |
| 5,581,886 A | | 12/1996 | Sesser et al. |

FOREIGN PATENT DOCUMENTS

WO    WO 89/00904    2/1989

* cited by examiner

Primary Examiner—Douglas D Watts
(74) Attorney, Agent, or Firm—W. Scott Carson

(57) ABSTRACT

A combined clamping and cutting tool for manually cutting plastic pipes. The cutting portion includes a pair of elongated members pivotally mounted to each other with each elongated member having a handle section and a cutting section. Cutting wheels are rotatably mounted to each cutting section. The clamping portion includes at least three members with the first and second members pivotally mounted to each other and the second and third members pivotally mounted to each other. The first and second clamping sections respectively have a pair of spaced-apart, parallel legs that firmly and slidably receive the cutting sections of the cutting portion therebetween. Interlocking tracks are also provided to maintain the clamping and cutting portions together during use and to provide an interaction between the two portions to aid in opening them to receive the pipe.

25 Claims, 12 Drawing Sheets

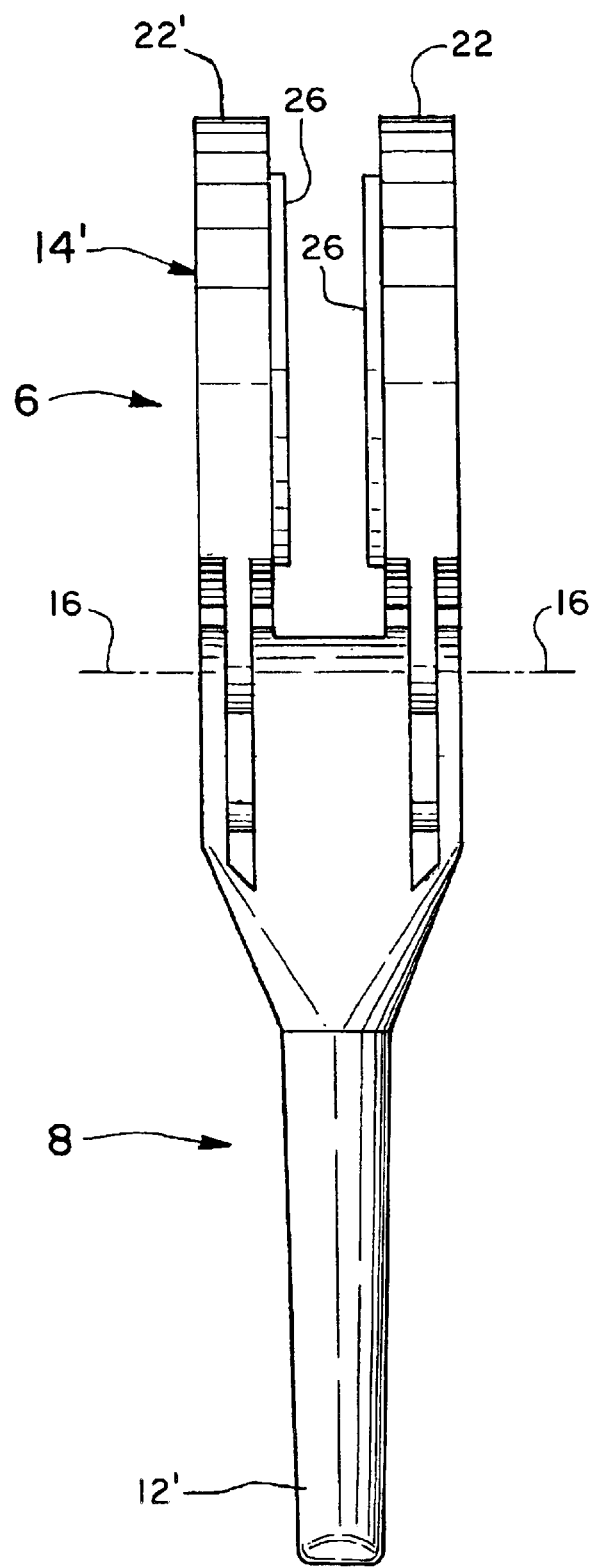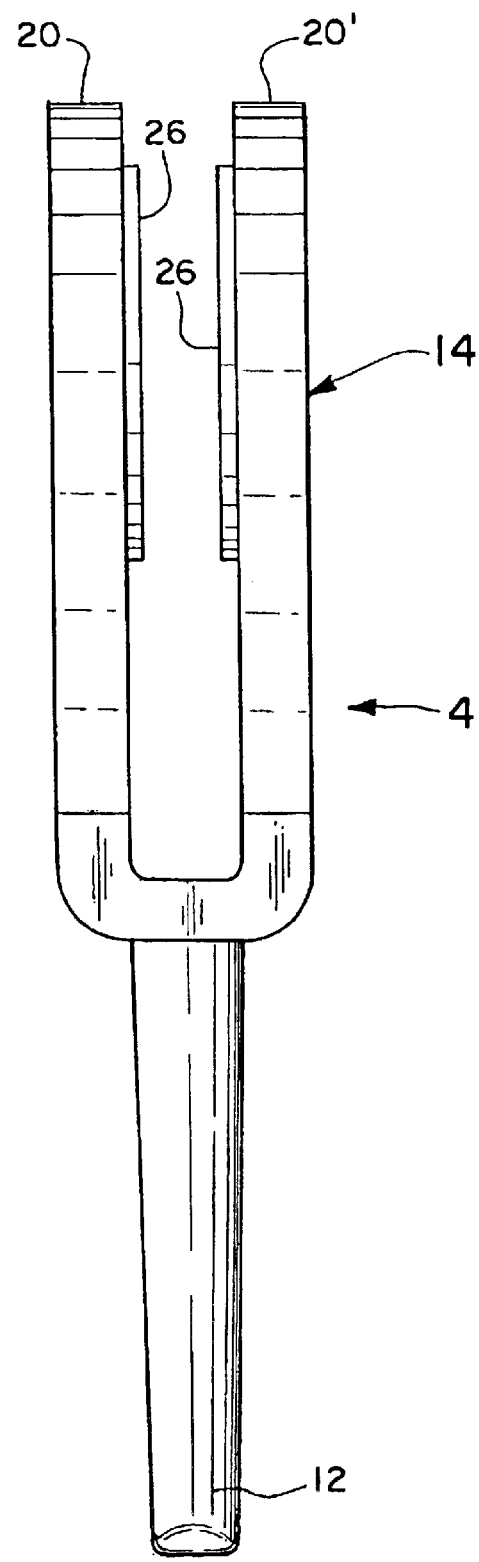
*Fig. 4*  *Fig. 5*

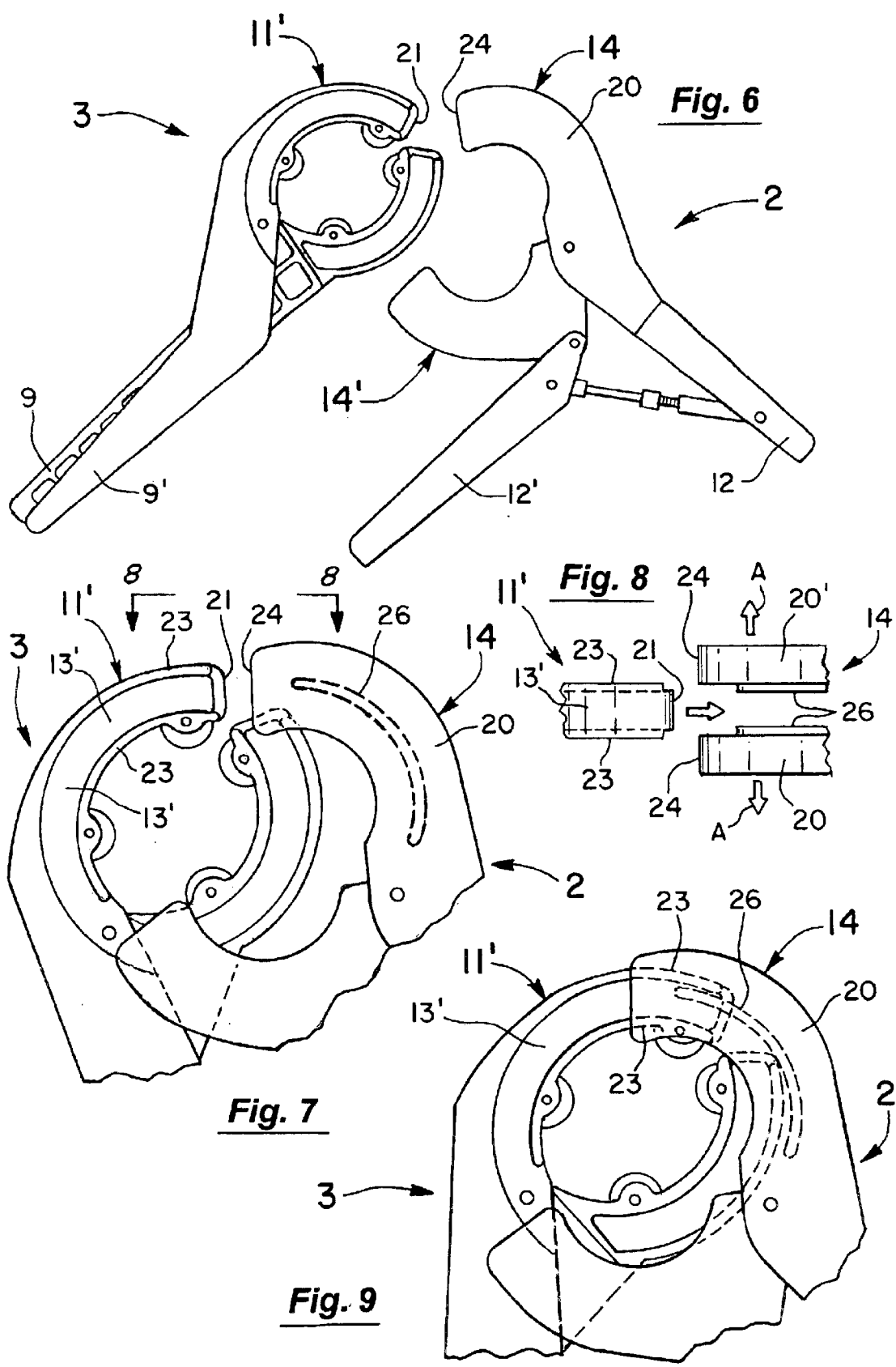

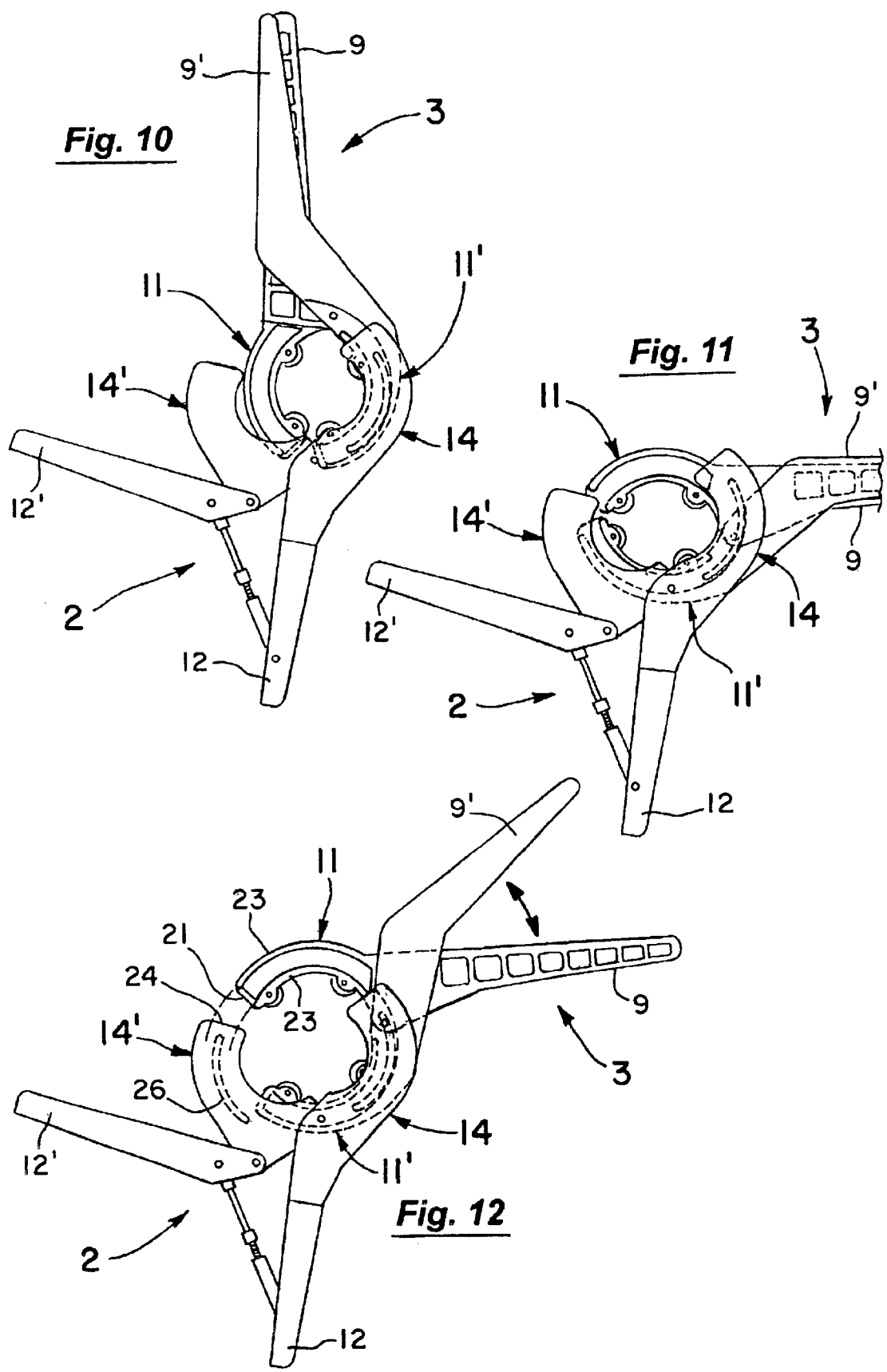

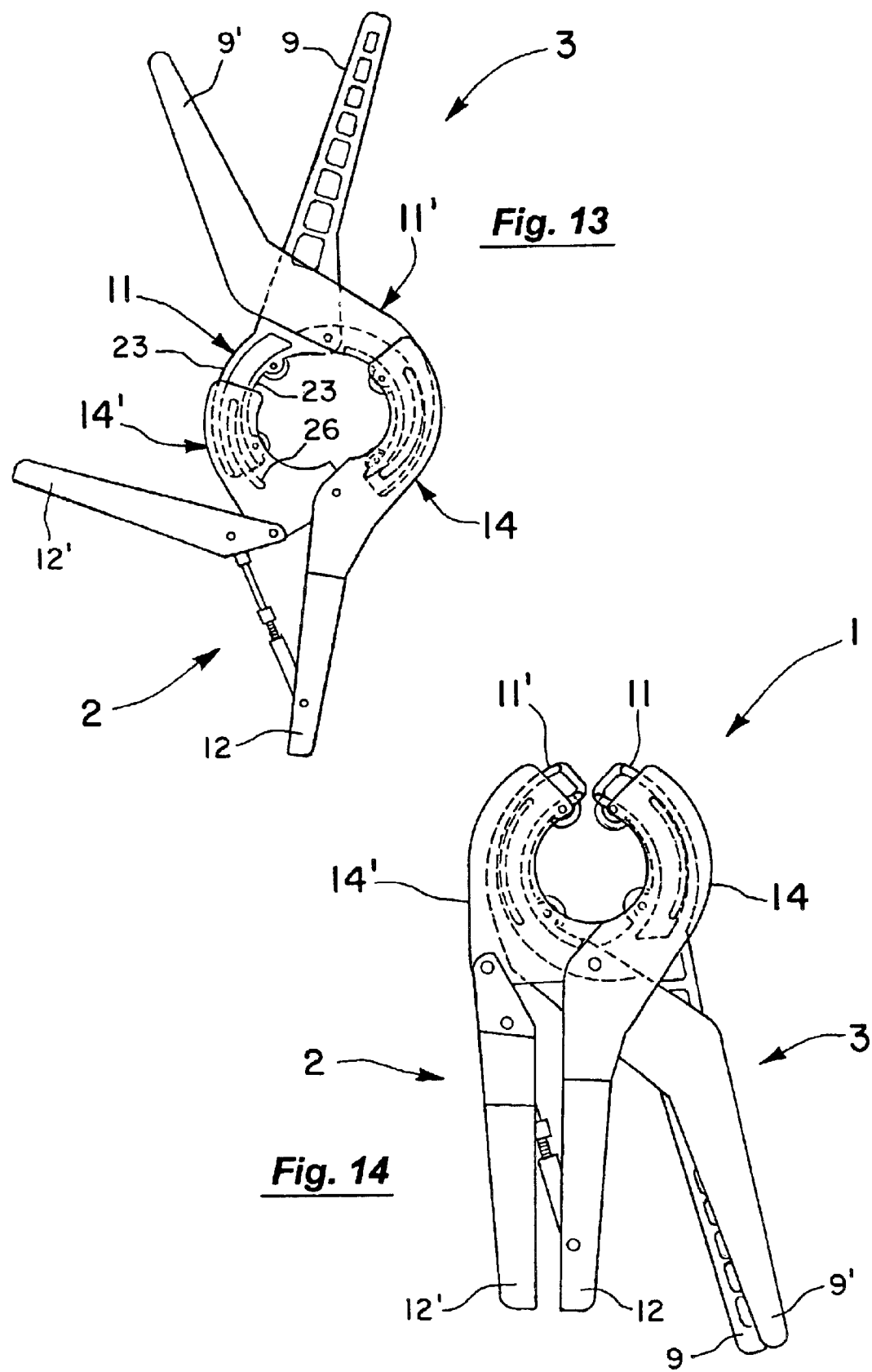

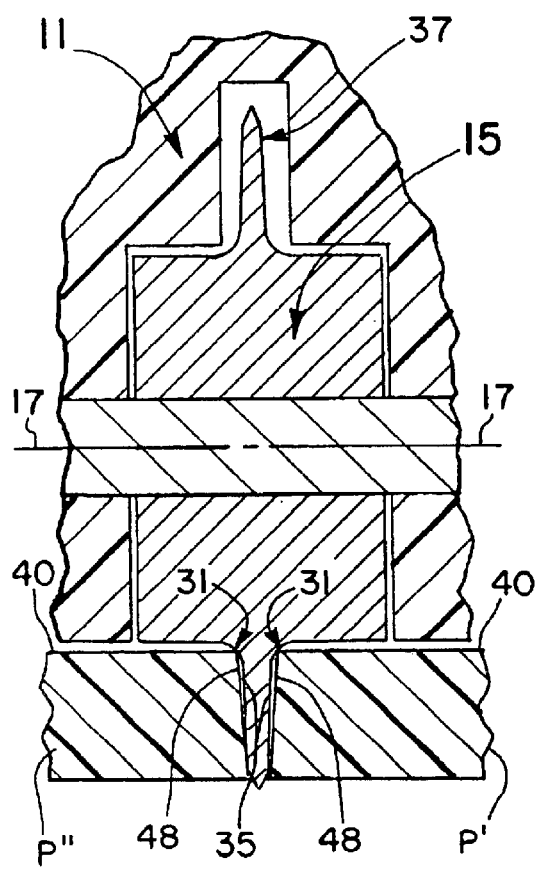
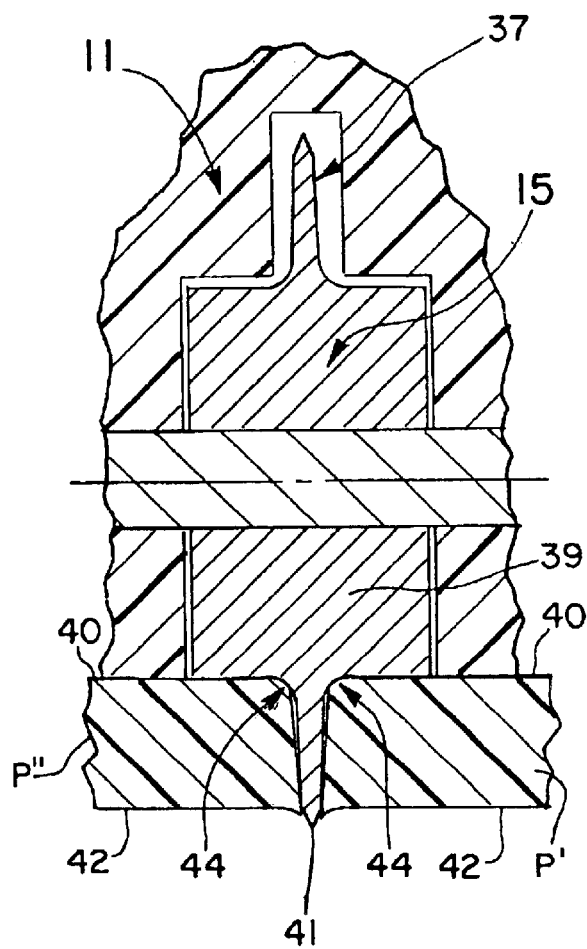
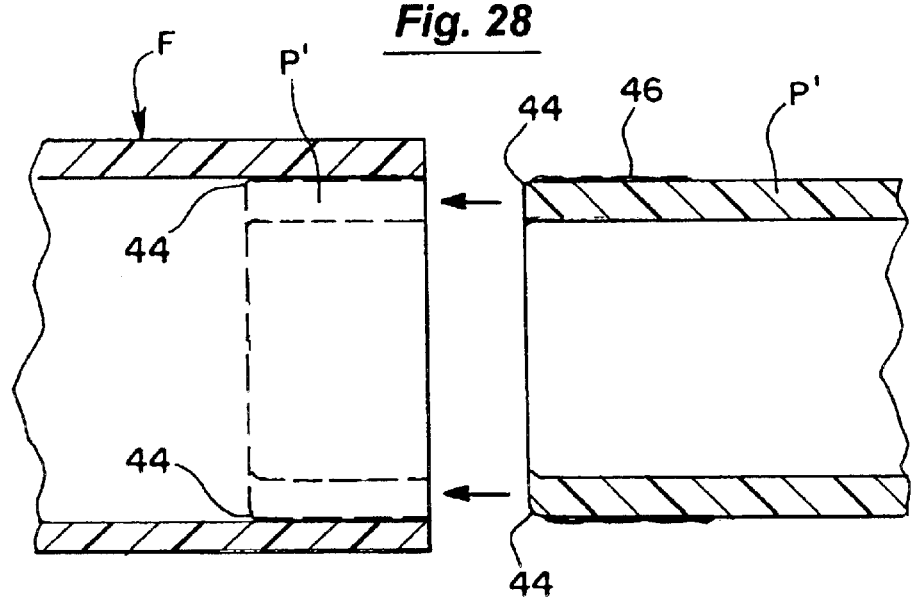

COMBINED CLAMPING AND CUTTING TOOL FOR PLASTIC PIPES

BACKGROUND OF THE INVENTION

1. Field of the Invention

This invention relates to the field of tools for cutting plastic pipes and more particularly to the field of hand-held tools for cutting hard plastic pipes wherein the tools have accompanying clamping arrangements to firmly grip the pipe and aid in maintaining the proper alignment of the tool's cutting portion.

2. Discussion of the Background

Plastic pipe cutters are widely available for cutting pipes of relatively hard plastics such as polyvinylchloride (PVC) and acrylonitrile butadiene styrene (ABS). Such pipes are commonly used in many applications to drain water and waste and to vent such systems. They are also used to contain electrical wiring. In cutting such pipes, it is desirable to have an accompanying clamping arrangement to firmly grip the pipe and additionally guide and maintain the cutting portion in the proper alignment with the pipe for a clean, straight cut.

In this regard and with manual or hand-held cutting tools that consist only of a scissor-like arrangement of pivoted blades, it is often very difficult to maintain the proper alignment with the pipe. In particular and as the handles of the tool are squeezed together and moved about the pipe, there is a tendency for the tool to rock or cock to one side out of a perpendicular alignment with the axis of the pipe. The result can be that the blades form a cutting path that spirals along the pipe and/or the final cut is not straight. With many such tools, the edges of the final cut are often irregular and raised and need to be sanded or otherwise smoothed to properly be received in a fitting. Adding a clamping arrangement to accompany the cutting portion of the tool to keep the cutting portion from rocking or cocking to one side greatly improves the quality of the cut. However, most such clamping arrangements are quite elaborate and somewhat difficult and time consuming to set up and use. They are for the most part impractical to use in the field to quickly and efficiently cut a hard plastic pipe, particularly pipes that are partially buried or otherwise in cramped quarters.

With this and other problems in mind, the present invention was developed. In it, a combined clamping and cutting tool is provided that can be effectively and efficiently used to cut plastic pipes. Both the clamping and cutting portions of the tool are manually operated and are mounted together as a unit for ease of use and storage.

SUMMARY OF THE INVENTION

This invention involves a cutting tool for plastic pipes. The tool has a clamping portion and a cutting portion operably connected together. The cutting portion includes a pair of elongated members pivotally mounted to each other with each elongated member having a handle section and a cutting section. Each cutting section has a main body with a pair of cutting wheels mounted to it. The cutting wheels are preferably mounted for rotation about axes substantially parallel to the pivotal axis of the elongated members.

The clamping portion includes at least three members with the first and second members pivotally mounted to each other and the second and third members pivotally mounted to each other. The first member has a handle section and clamping section and the second member also includes a clamping section. The third member has a handle section which is mounted to the second member for pivotal movement. Each clamping section has a pair of spaced-apart, parallel legs that firmly and slidably receive the cutting sections of the cutting portion therebetween. Interlocking tracks are also provided to maintain the clamping and cutting portions together during use and to provide an interaction between the two portions to aid in opening them to receive the pipe.

In operation, the handles of the clamping and cutting portions of the assembled tool can be manually manipulated to open the respective clamping and cutting sections to receive the pipe. In doing so, there is an interaction between the interlocking tracks on the two portions to aid in their opening. Once on the pipe with the clamping portion firmly gripping it, the handles of the cutting portion can be squeezed and reciprocated along an arc about the pipe to progressively advance the cutting wheels into and through the pipe to make a cut. The cutting wheels preferably have a radius section on them which bevels or rounds the outer edge of the pipe for a smooth, clean cut that can be easily received and sealed in a fitting.

BRIEF DESCRIPTION OF THE DRAWINGS

FIG. 4 is a view taken along line 4—4 of FIG. 2.

FIG. 5 is a view taken along line 5—5 of FIG. 2.

FIGS. 6–14 illustrate one manner of assembling the clamping and cutting portions of the combination tool.

FIG. 28 shows the advantage of beveling the pipe during the cutting procedure so as to facilitate its being received and sealing in a fitting.

DETAILED DESCRIPTION OF THE INVENTION

Figure 1:
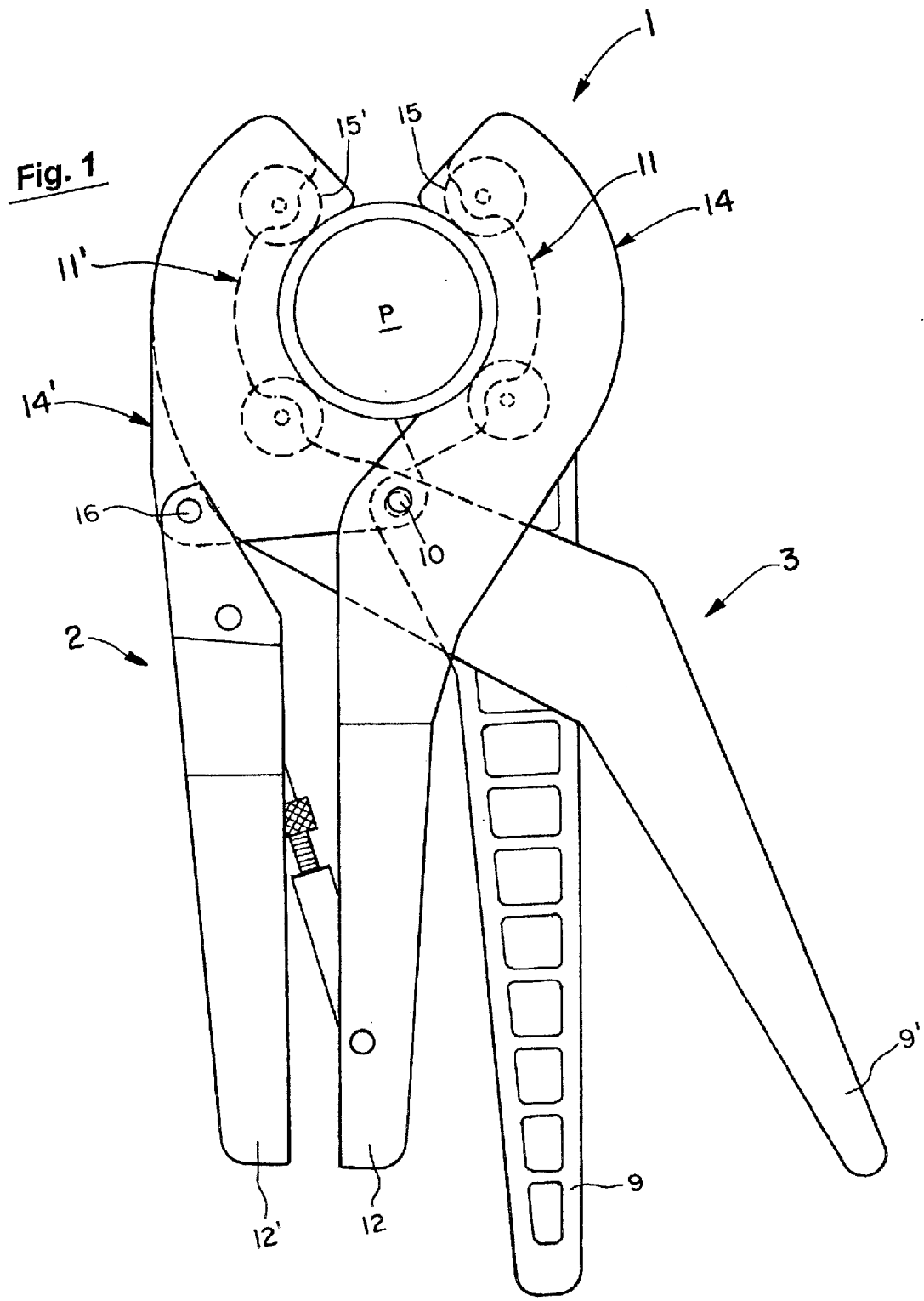
FIG. 1 illustrates the combined clamping and cutting tool of the present invention in a clamped position on the plastic pipe ready to initiate the cutting procedure.
Figure 3:
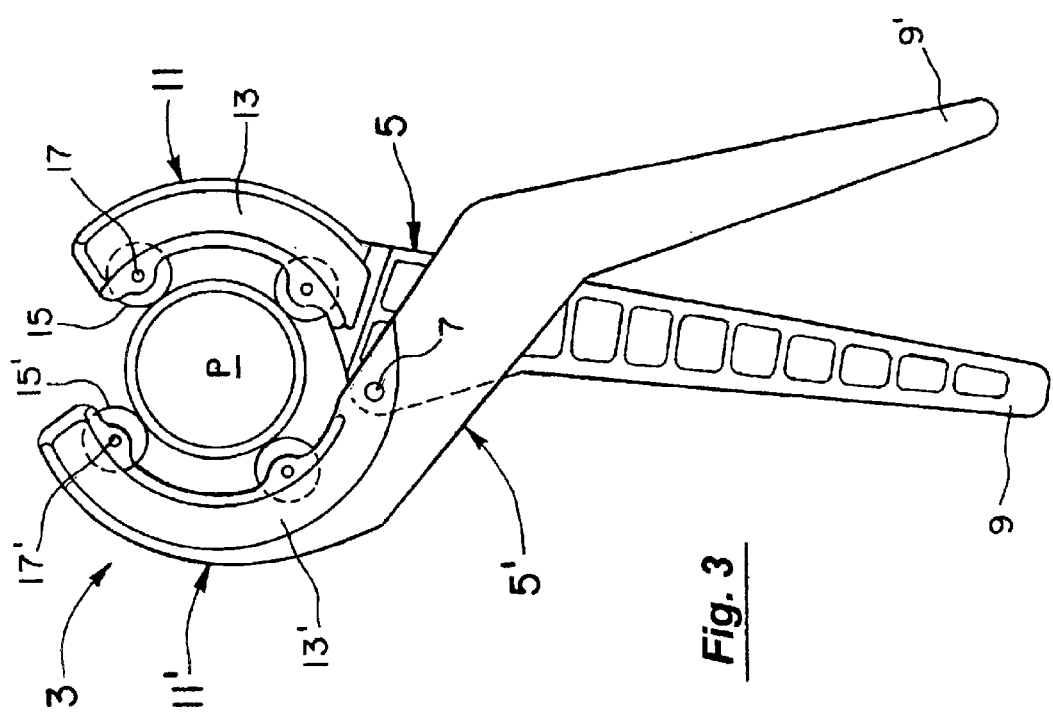
FIG. 3 is an individual view of the cutting portion of the combined tool of FIG. 1.

FIG. 1 illustrates the combined clamping and cutting tool 1 of the present invention in a clamped position on the plastic pipe P ready to initiate the cutting procedure. The combined tool 1 has a clamping portion 2 (see FIG. 2) and a cutting portion 3 (FIG. 3). The cutting portion 3 of FIG. 3 includes a pair of elongated members 5, 5' mounted to each other between the respective ends thereof for pivotal movement relative to each other about the pivotal axis 7. Each elongated member 5, 5' has a handle section 9,9' and a cutting section 11,11' respectively extending outwardly of the pivotal axis 7 in substantially opposite directions. Each cutting section 11, 11' has a main body 13, 13' with a pair of cutting wheels 15,15' mounted thereto. The cutting wheels 15,15' are preferably mounted for rotation about axes 17,17' substantially parallel to the pivotal axis 7.

Figure 2:
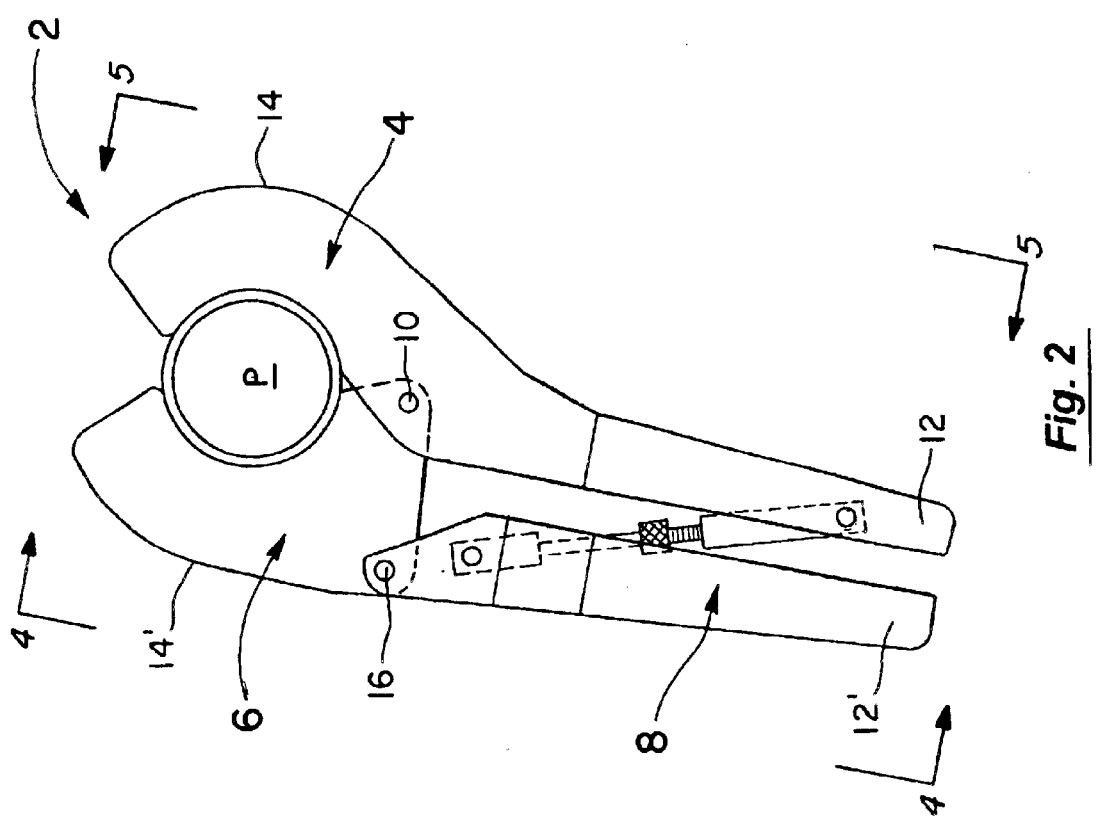
FIG. 2 is an individual view of the clamping portion of the combined tool of FIG. 1.
Figure 15:
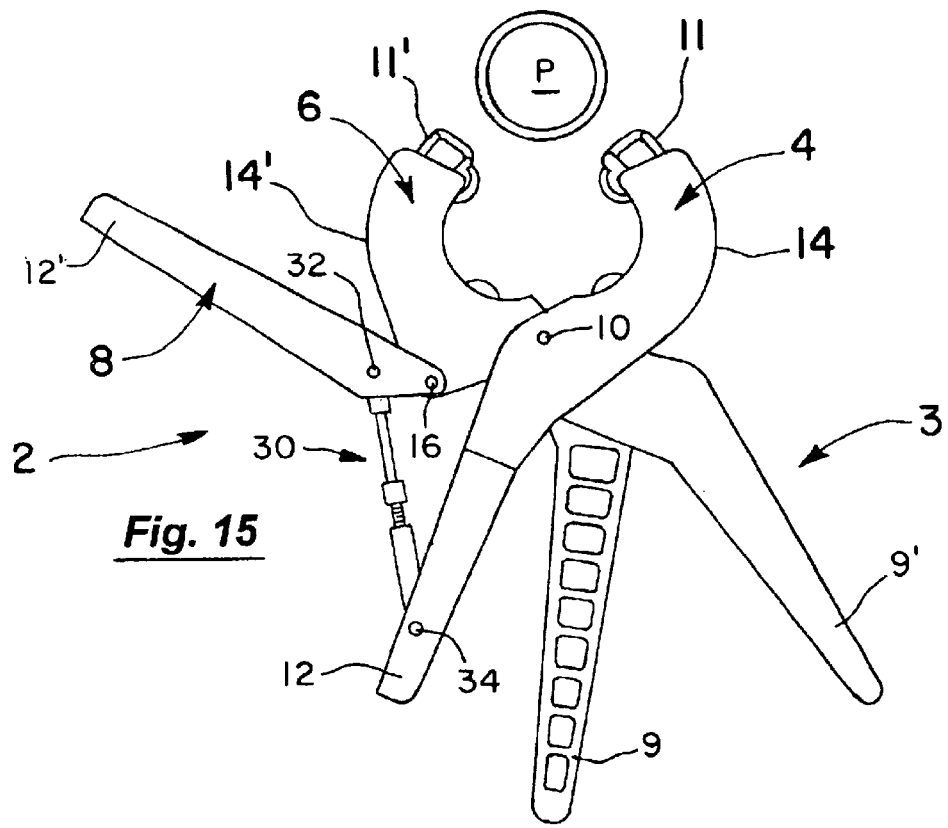
FIGS. 15–18 illustrate the tool of the present invention in use to cut a pipe.

The clamping portion 2 of FIG. 2 includes at least three members 4, 6, and 8. The first and second members 4 and 6 are mounted to each other as shown in FIG. 2 for pivotal movement relative to each other about the pivotal axis 10. The first member 4 of the clamping portion 2 (see FIG. 2) has a handle section 12 and clamping section 14 respectively extending outwardly of the pivotal axis 10 in substantially opposite directions. The second member 6 also has a clamping section 14' facing the clamping section 14 of member 4. The third member 8 of the clamping portion 2 has a handle section 12' which is mounted to the second member 6 for pivotal movement about the pivotal axis 16. As explained in more detail below, the pivotal axis 16 of the second and third members 6 and 8 in the assembled tool 1 of FIG. 1 is substantially parallel to the pivotal axis 10 of the clamping portion 2 as well as substantially parallel to the pivotal axis 7 of the cutting portion 3.

As best seen in FIGS. 2 and 5, the clamping section 14 of the first member 4 of the clamping portion 2 on the right side of FIG. 2 has two, spaced-apart and parallel legs 20,20' (see FIG. 5) upstanding from the handle section 12. Similarly, the opposing clamping section 14' of the second member 6 of the clamping portion 2 on the left side of FIG. 2 has two, spaced-apart and parallel legs 22,22' (see FIG. 4) upstanding from the handle section 12' of the third member 8. The legs (e.g., 20,20') of each pair in this regard are substantially parallel to one another and each leg (e.g., 20) of one pair (e.g., 20,20') is substantially coplanar with a leg (e.g., 22) of the other pair (e.g., 22,22'). Further, the spaced-apart pairs of legs 20,20' and 22,22' are preferably dimensioned to firmly and slidably receive the cutting sections 11,11' of the cutting portion 3 therebetween.

More specifically, the clamping portion 2 and cutting portion 3 of the combined tool 1 can be assembled together in a number of ways. One such assembly technique is illustrated in FIGS. 6–14. In this technique, the clamping portion 2 and cutting portion 3 are manually positioned as in FIG. 6 with the handle sections 12,12' of the clamping portion 2 spread apart to open the facing, clamping sections 14,14'. With the handle sections 9,9' of the cutting portion 2 clasp together, the end 21 of the cutting section 11' of the cutting portion 2 in FIG. 6 is advanced toward the end 24 of the clamping section 14 of the clamping portion 2 (see also FIG. 7). As shown in FIGS. 7–9, the main body 13' of the cutting section 11' has a pair of spaced-apart, curved tracks 23 running along each outer side thereof. The clamping section 14 in turn has a single, curved track 26 running on each inner side of the two legs 20,20' thereof (see also FIG. 8). The width of the end 21 of the cutting section 11' as illustrated in FIG. 8 is substantially the same and preferably slightly greater than the distance between the spaced-apart legs 20,20'. In the preferred arrangement, the legs 20,20' then need to be slightly pried or manually spread apart (as indicated by arrows A in FIG. 8) to receive and advance the end 21 of the cutting section 11' between the legs 20,20' to the position of FIG. 9. In doing so, the single tracks 26 on each inner side of legs 20,20' of the clamping section 14 in FIG. 8 are respectively received between each pair of tracks 23 on each outer side of the cutting section 11'.

Once the respective tracks 23,26 are so aligned and interlocked as in FIG. 9, the cutting portion 3 can be rotated to the substantially vertical position of FIG. 10. From there, the cutting portion 3 can be further rotated to the position of FIG. 11 after which the handles 9,9' (see FIG. 12) can be spread apart to open the cutting sections 11,11'. This in turn will space and align the end 21 in FIG. 12 of the cutting section 11 and the end 24 of the clamping section 14'. The steps of FIGS. 7–9 can then be essentially repeated as to ends 21 and 24 of FIG. 12 of cutting section 11 and clamping section 14' to capture (see FIG. 13) the corresponding single tracks 26 of the inner sides of the clamping section 14' in the corresponding pairs of tracks 23 on the outer sides of the cutting section 11. In the position of FIG. 13, the clamp handles 12,12' can subsequently be closed followed by the cutting handles 9,9' and the cutting portion 3 rotated to the position of FIG. 14 for packaging or storage.

In use as illustrated in FIGS. 15–18, the clamping handles 12,12' of FIG. 14 are preferably first spread apart (FIG. 15) which in turn opens the clamping sections 14,14'. Additionally and due to the interaction between the tracks 23 and 26 (as will be explained in more detail below), the cutting handles 9,9' and cutting sections 11,11' of the cutting portion 3 will also be initially spread apart by the action of FIG. 15. With the cutting handles 9,9' spread apart by this action of FIG. 15, the adjacent clamp handle 12 and cutting handle 9 (see FIG. 16) can be manually gripped and squeezed together. This squeezing will further open the cutting handles 9,9' and cutting sections 11,11' due again to the interaction between the tracks 23 and 26 as will be explained in more detail below.

Figure 16:
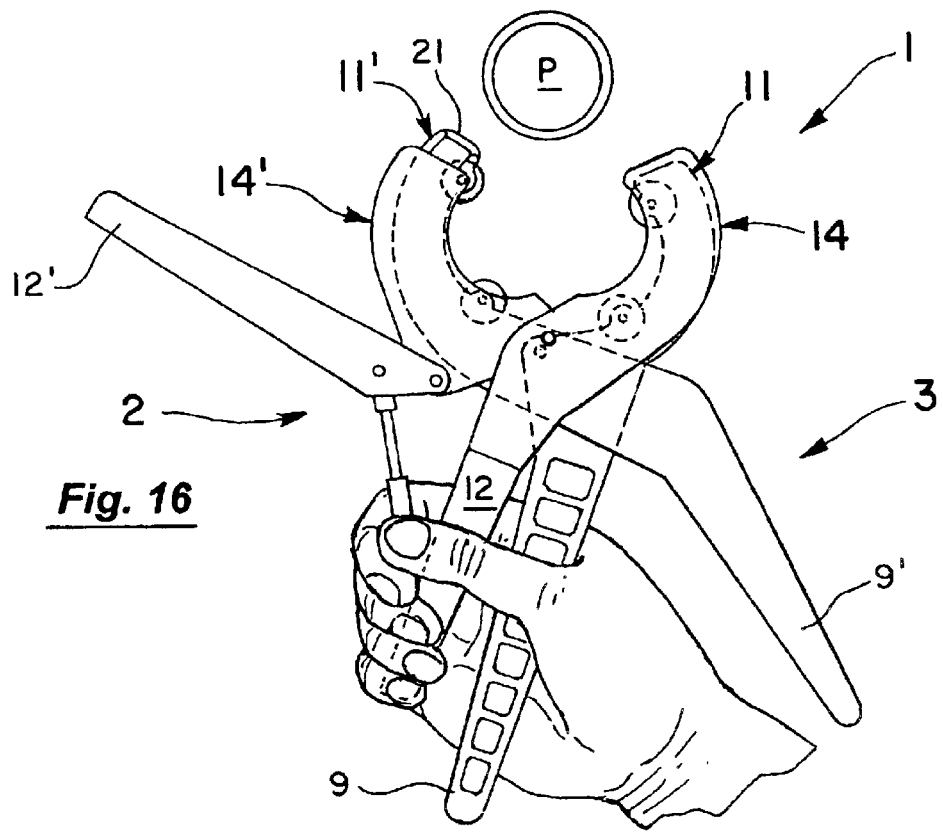
Figure 17:
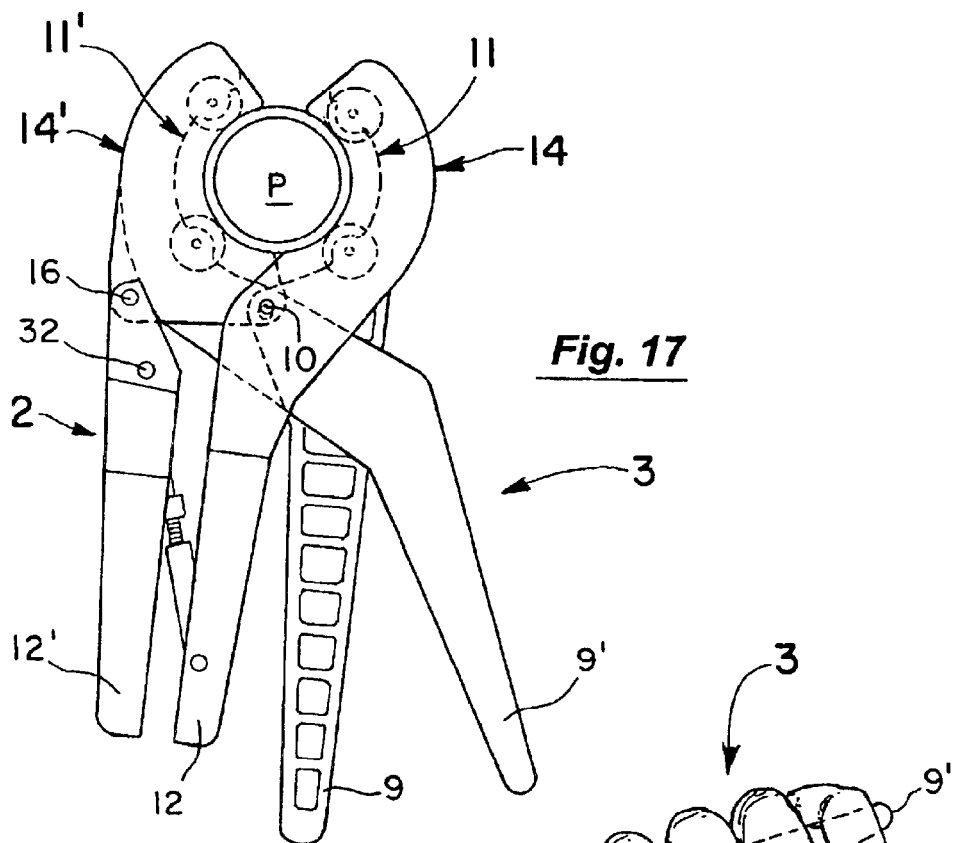
Figure 18:
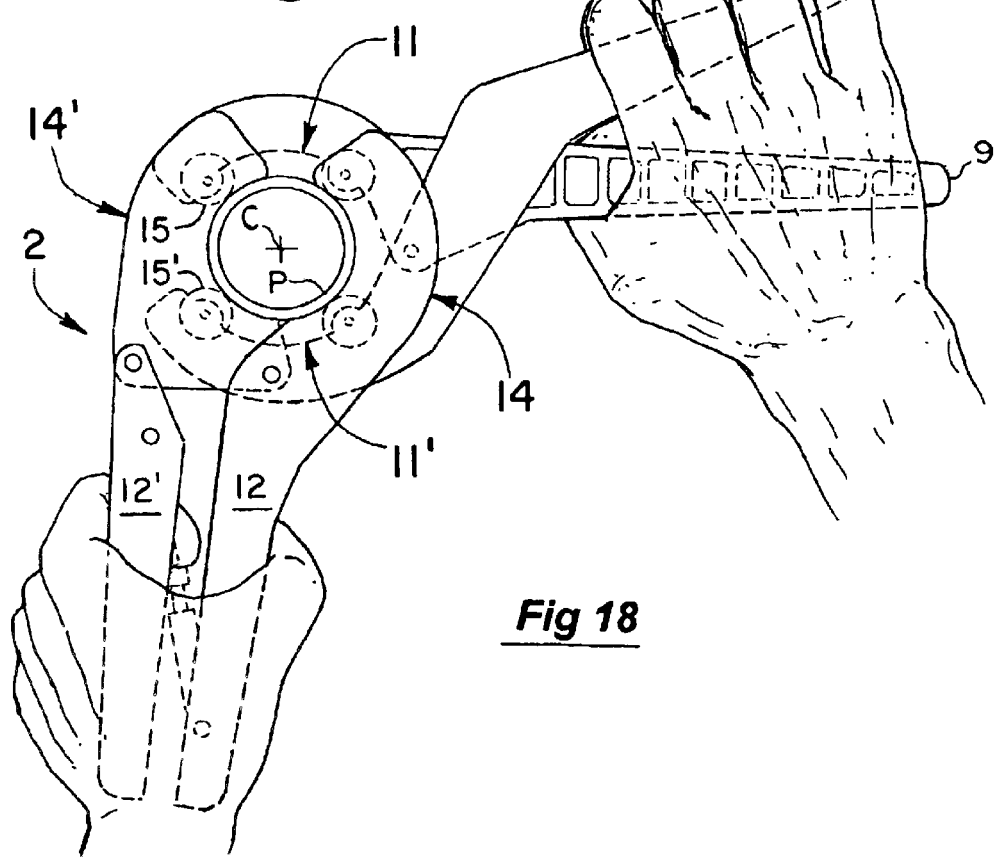

The opened, clamping sections 14,14' and cutting sections 11,11' of FIG. 16 can subsequently be advanced to receive the pipe P. Once so received, the clamping handles 12,12' are manually moved toward one another to the overcenter or closed position of FIG. 17 to firmly grip the pipe P between the facing, clamping sections 14,14'. In this regard, the clamping handles 12,12' are preferably provided with an adjustable arrangement or mechanism such as the turnbuckle 30 of FIG. 15 that is mounted at the ends thereof for pivotal movement about respective axes 32 and 34. In the clamping movement from FIG. 15 to FIG. 17, the pivotal axis 16 between members 6 and 8 moves from one side of a plane containing axes 10 and 32 (FIG. 15) to the other side of a plane containing axes 10 and 32 (FIG. 17). In the overcenter position of FIG. 17, the clamping sections 14,14' are firmly locked in a closed, gripping position on the pipe P. The axes 10 and 16 in this regard are and remain parallel and at a fixed distance apart from one another.

With the clamping portion 2 in the closed position of FIG. 17, the handle sections 9,9' of the cutting portion 3 can be gripped (FIG. 18) and rotated through repeated arcs of substantially 90 degrees about the central or pipe axis C. The cutting wheels 15,15' in this regard are preferably spaced substantially 90 degrees from one another about the axis C. As the cutting portion 3 is reciprocally rotated (e.g., four times) about the pipe P, the cutting handles 9,9' are gradually squeezed together to then advance the cutting wheels 15,15' into and through the pipe P. To the extent there are more or fewer cutting wheels, the reciprocating arc can be reduced or increased accordingly (e.g., six wheels through a substantially 60 degree arc). In the preferred embodiment with each pair of legs 20,20' and 22,22' of clamp members 4 and 6 (see FIGS. 4 and 5) spaced apart slightly less than the width of the cutting sections (11,11') as discussed in regard to FIG. 8, the legs of each pair in the preferred embodiment are then slightly biased together or toward one another when the respective cutting sections are received therebetween. In any event, the spacing between the legs pairs 20,20' and 22,22' preferably maintains the cutting sections 11,11' in substantially a 90 degree alignment with the pipe axis C during the cutting procedure.

Figure 19:
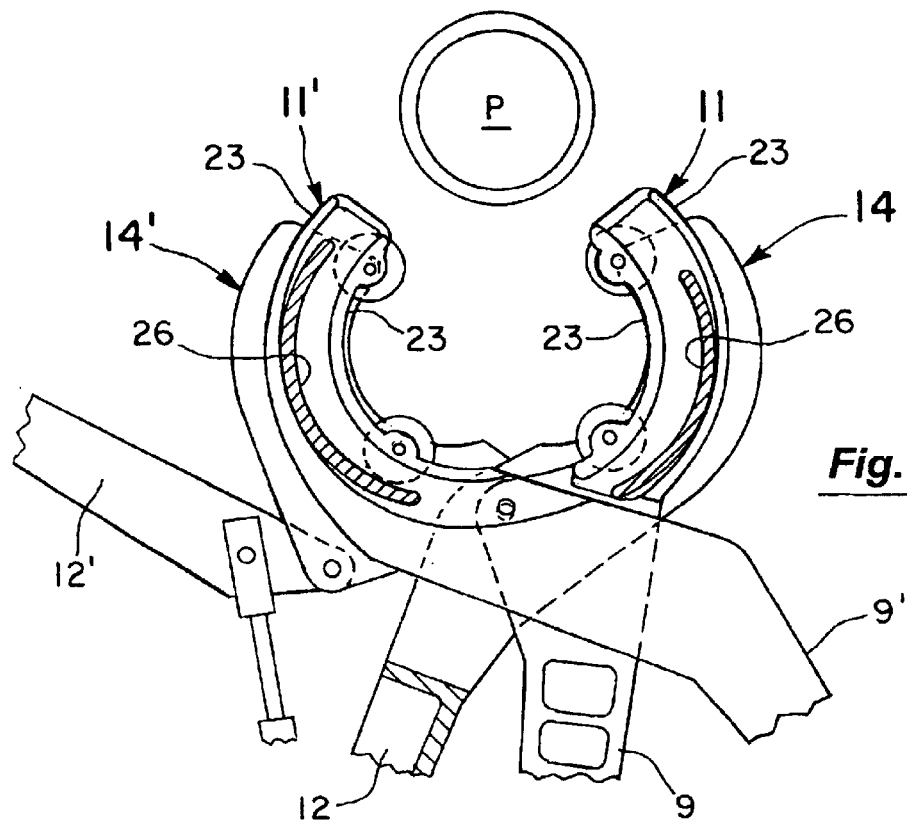
FIGS. 19–23 show the interaction between the interlocking tracks of the clamping and cutting portions of the tool during the steps of FIGS. 15–18 and additionally as the cutting wheels are advanced through the pipe.
Figure 20:
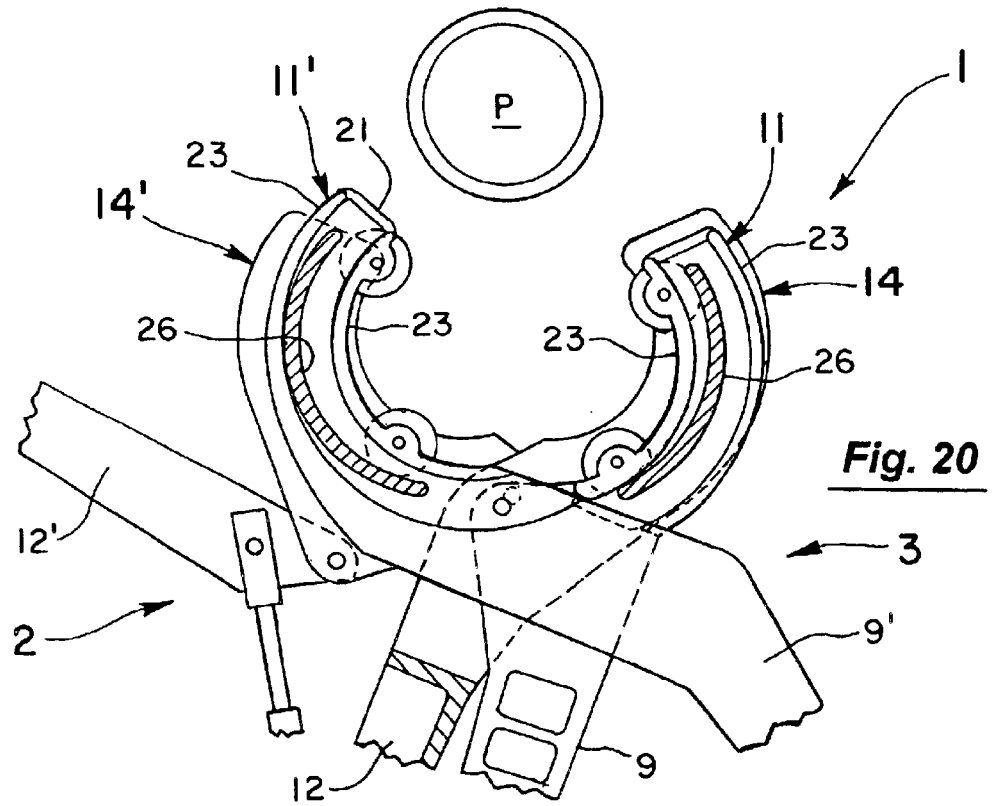

As also indicated above, the interlocking tracks 23 and 26 of the assembled tool 1 not only keep the clamping portion 2 and cutting portion 3 together but also facilitate the coordinated operation of the two portions 2 and 3. More specifically and due to the interaction between the tracks 23 and 26 as illustrated in FIG. 19, the initial spreading apart of the clamping handles 12,12' to the position of FIGS. 15 and 19 not only will open the clamp sections 14,14' but also will initially open the cutting handles 9,9' and cutting sections 11,11'. Thereafter, the adjacent clamping handle 12 and cutting handle 9 can be manually squeezed together (FIGS. 16 and 20) to further open the cutting handles 9,9' and cutting sections 11,11'. This is again due to the contacting interaction of the tracks 23 and 26. With the grip between handles 12 and 9 in FIGS. 16 and 20 relaxed, the tool 1 is advanced to receive the pipe P. In doing so and due to the spacing (e.g., ½ inch) between each pair of tracks 23 being greater than the width (e.g., 3/32th inch) of each single track 26, the single track 26 can move laterally between the respective pair of tracks 23. Consequently, the cutting portion 3 can then move or float relative to the clamping portion 2. That is, with a relaxing of the grip of FIG. 16, the cutting portion 3 can float relative to the clamping portion 2 as the tool 1 is advanced to receive the pipe P. This is advantageous because in the position of FIG. 16 and 20, the ends of the cutting portions 11,11' may not necessarily align with the ends of the opened clamp sections 14,14' An end (e.g., 21) of the cutting sections (e.g., 11') as illustrated in FIGS. 16 and 20 may actually extend into the opening between the clamping sections 14,14'. With the float discussed above, the tool 1 can still be advanced toward the pipe P wherein the protruding end 21 of the cutting section 11' may well contact the pipe P to physically open or move the cutting sections 11,11' to align with the clamping sections 14,14' or as otherwise needed to receive the pipe P.

Once the clamping portion 2 is closed (FIGS. 17 and 21) to firmly grip the pipe P between the clamping sections 14,14', the cutting handles 9,9' as explained above can be grasp with the user's hand and squeezed to initially engage the pairs of cutting wheels 15,15' on the pipe P. The tolerance between the tracks 23 and 26 in this regard allows the cutting portion 3 to again move or float so as to center the cutting wheels 15,15' about the pipe P in the position of FIG. 21. Further squeezing and reciprocal rotation of the cutting portion 3 in the fashion of FIG. 18 will then advance the cutting wheels 15,15' through the outer pipe wall 40 toward the inner pipe wall 42 (FIG. 22) and eventually through the inner pipe wall 42 (FIG. 23) to cut the pipe P. For ease of gripping the handles 9,9' for the cutting procedure and for performing the initial opening steps above, it is noted that the handles 9,9' of the cutting portion 2 are preferably longer than the handles 12,12' of the clamping portion 2.

Figure 21:
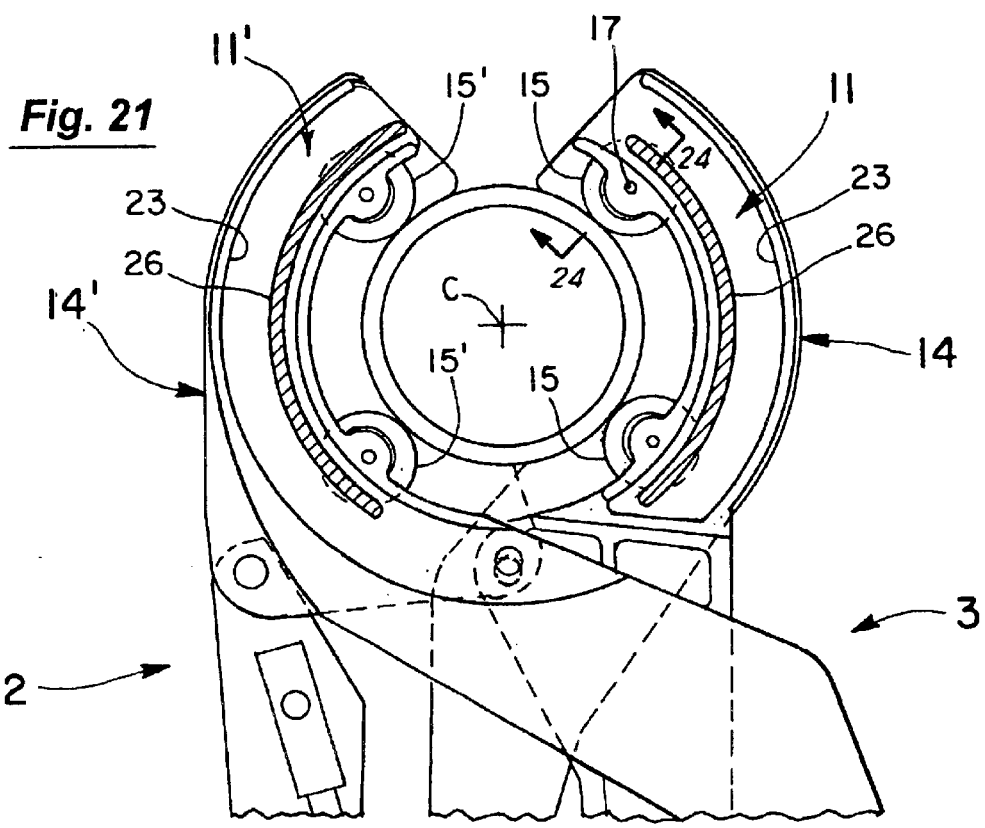

The geometry of the interlocking tracks 23 and 26 can vary to accomplish the interaction discussed above. However, as illustrated in FIG. 21 and in the preferred embodiment, the curved tracks 23 and 26 are essentially concentric with one another in this position of FIG. 21 in which the cutting wheels 15,15' are initially contacting the outer pipe wall 40. In this position, the concentric tracks 23 and 26 have a common, central axis C which is also the central axis of the pipe P. The interlocking tracks 23, 26 could be respectively on the clamping sections 14,14' and cutting sections 11,11' or combinations thereof if desired. Additionally, a single set of interlocking tracks 23,26 between a respective cutting section and a clamping section could be used. It is further noted as illustrated that the pivotal axes 10 and 16 of the clamping portion 2 remain at a fixed distance from each other and the pivotal axis 7 of the cutting portion 3 moves relative to the axes 10 and 16 as the cutting portion 3 is moved relative to the clamping portion 3 about the pipe P.

Figure 22:
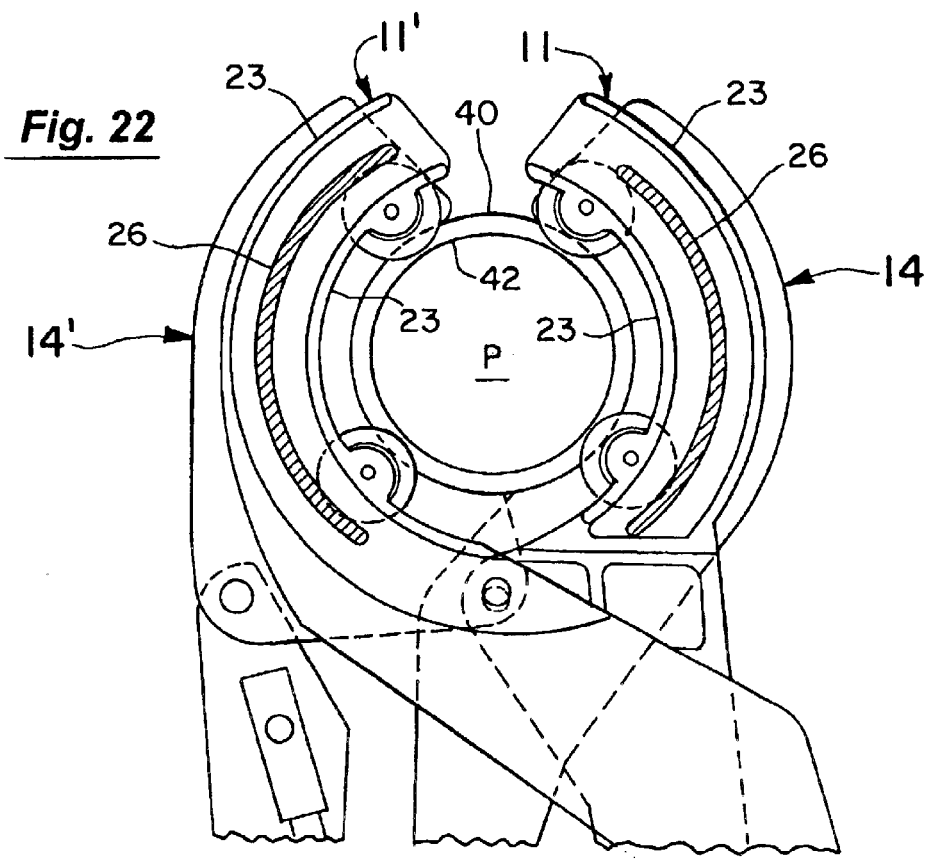
Figure 23:
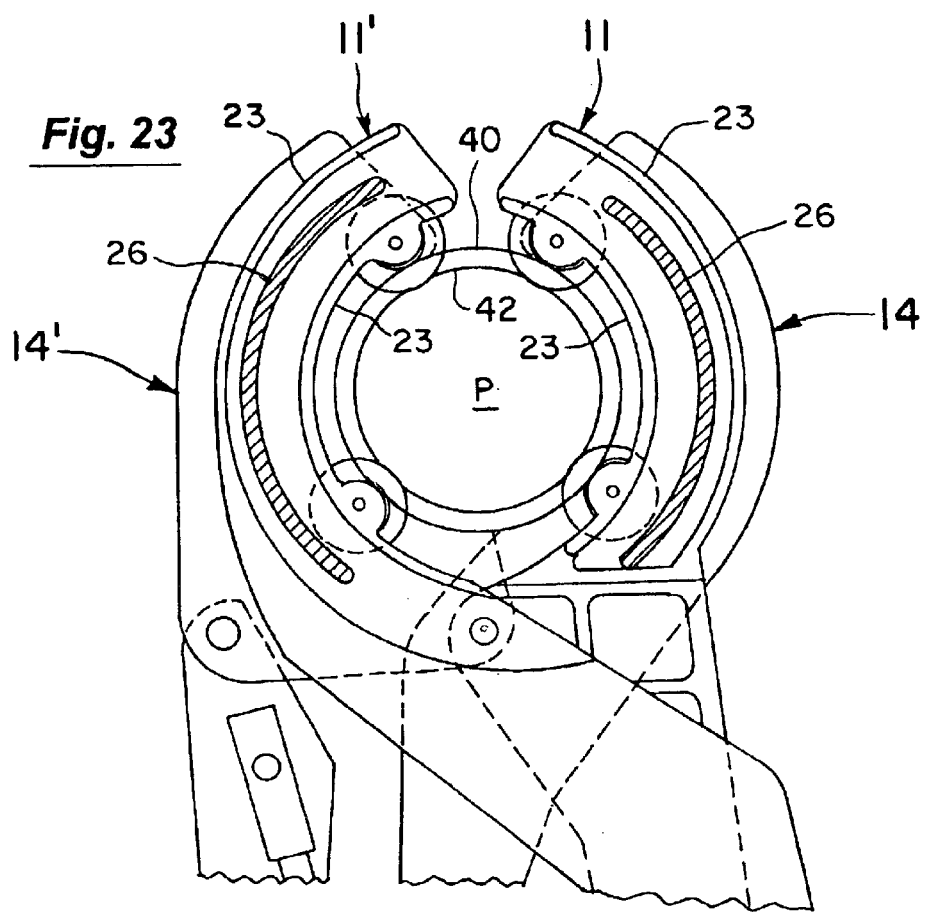
Figure 24:
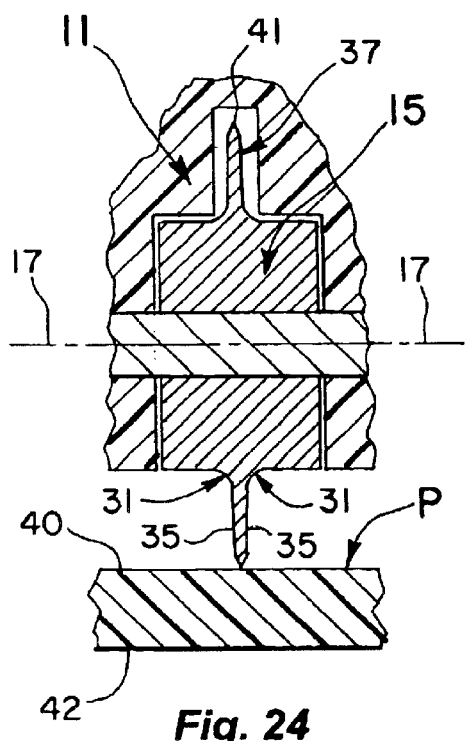
FIG. 24 is a view taken along line 24—24 of FIG. 21 and together with FIGS. 25–27 illustrate the action of the cutting wheels in the steps of FIGS. 21–23 to cut through and bevel the pipe.
Figure 25:
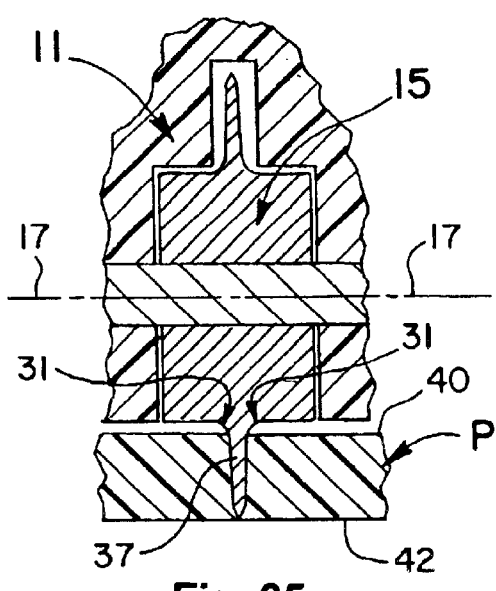

FIG. 24 is a view taken along line 24—24 of FIG. 21 and together with FIGS. 25–27 illustrate the action of the cutting wheels 15,15' in the steps of FIGS. 21–23 to cut through and bevel the pipe P. In this regard, the cutting wheels (e.g., 15 in FIG. 24) are provided with a radius section 31 between each side 35 of the substantially annular blade section 37 and the main body 39 of the illustrated wheel 15. Consequently, as the cutting wheel 15 is advanced to cut through the outer and inner pipe walls 40,42 in FIGS. 24–27, a rounded bevel 44 is put on each edge of the outer wall 40 (see FIG. 27) as the edge 41 of the blade 37 cuts through the pipe and is advanced to the position of FIG. 27. The round, smooth bevel 44 (see FIG. 28) then permits a good fit and seal as the end of the cut pipe section P' is wiped with sealing cement 46 and inserted into the fitting F. The ability to put such a rounded and smooth bevel 44 on the edge of the outer pipe wall 40 is made possible because the pipe P is being gripped by the clamping portion 2 during the cutting operation as set forth above. As a result, the cutting edge 41 of the blade section 37 (see FIG. 27) can be advanced beyond the inner pipe wall 42 to fully engage the radius sections 31 with the outer edges of the fully cut pipe. Cutting tools without clamping arrangement would not be able to so advance the cutting edge 41 beyond the inner pipe wall 42 as in FIG. 27 to form the bevels 44 because the cut pipe sections P' and P" would simply fall apart once the cut was completed. The cut pipe sections in such a case then tend to have raised and undesirable lips on their outer wall edges as a result of the plowing effect of the cutting blade (much like those shown on the inner wall edges of pipe walls 42 adjacent the blade edge 41 in FIG. 27).

Another advantage of the radius sections 31 of the cutting wheel 15 is illustrated in FIGS. 25 and 26. As shown in FIG. 25, each radius section 31 first begins to contact the outer pipe wall 40 on either side of the V-shaped cut (FIG. 25) before the blade 37 actually cuts through the inner pipe wall 42. Consequently, as the blade 37 is further advanced to cut through the inner pipe wall 42 to the position of FIG. 26, the pipe sides 48 of the V-shaped cut (FIG. 26) are actually spread apart and away from contact with the tapering sides 35 of the cutting blade 37. To accomplish this, the blade 37 as illustrated preferably extends for a distance in a direction substantially perpendicular to the rotational axis 17 of the cutting wheel 15 less than the distance between the outer and inner pipe walls 40,42. That is, the distance of the blade sides 35 from the respective radius sections 31 to the blade edge 41 in a direction perpendicular to the axis 17 is less than the thickness of the pipe walls 40,42. In this manner, the spread apart sides 48 of the pipe cut will not bind against the blade 37 as the blade 37 is advanced through the pipe P. The blade 37 can then more easily finish the cut and bevel. The risk of the blade 37 breaking or snapping from being pinched between the pipe sides 48 is also greatly reduced. It is noted that although the present invention is shown in use cutting hard plastic pipes (e.g., 2 inch inner diameter) with relatively thick walls (e.g., 0.2 inches), it can also be used to cut thinner and softer plastic pipes as well as metal (e.g., copper) ones.

While several embodiments of the present invention have been shown and described in detail, it to be understood that various changes and modifications could be made without departing from the scope of the invention.

I claim:

1. A combined clamping and cutting tool (1) primarily intended for manually cutting plastic pipes, said tool comprising:

a clamping portion (2) and a cutting portion (3), said cutting portion (3) including a pair of elongated members mounted to each other between the respective ends thereon for pivotal movement relative to each other about a first pivotal axis (7), each elongated member having a handle section (9,9') and a cutting section (11,11') respectively extending outwardly of said first pivotal axis (7) in substantially opposite directions, each cutting section having a main body (13,13') with at least one cutting wheel (15,15') mounted thereto for rotation relative to said main body about a rotational axis (17,17') substantially parallel to said first pivotal axis, said cutting sections and the cutting wheels thereof facing one another in an open position to receive a pipe therebetween wherein movement of the two handle sections (9,9') toward one another about said first pivotal axis (7) moves said cutting sections (11,11') and the cutting wheels (15,15') thereof toward one another about said first pivotal axis (7), and said clamping portion (2) including at least three members, said first (4) and second (6) members being mounted to each other for pivotal movement relative to each other about a second pivotal axis (10), said second pivotal axis (10) being substantially parallel to said first pivotal axis (7) of said cutting portion, said first member (4) of said clamping portion having a handle section (12) and a clamping section (14) respectively extending outwardly of said second pivotal axis (10) in substantially opposite directions, said second member (6) having a clamping section (14'), said third member (8) of said clamping portion having a handle section (12') mounted to said second member (6) of said clamping portion for pivotal movement about a third pivotal axis (16), said third pivotal axis (16) being substantially parallel to said first (7) and second (10) pivotal axes wherein each of said clamping sections (14,14') includes two legs (20,20' and 22,22') spaced apart from each other to respectively receive at least one of said cutting sections (11,11') of said cutting portion therebetween.

2. The tool of claim 1 wherein the legs of each pair are substantially parallel to one another.

3. The tool of claim 1 wherein the legs of each pair are substantially parallel to one another and each leg of one pair is substantially coplanar with a leg of the other pair.

4. The tool of claim 1 wherein the legs of one pair are spaced apart a distance substantially the same as the width of the cutting section received therebetween.

5. The tool of claim 1 wherein the legs of one pair are spaced apart a distance slightly less than the width of the cutting section wherein the legs are slightly biased toward one another when the cutting section is received therebetween.

6. The tool of claim 1 wherein said second (10) and third (16) pivotal axes are at a fixed distance from each other and said cutting sections (11,11') of said cutting portion are mounted for movement relative to said clamping sections (14,14') to move said first pivotal axis (7) relative to said second (10) and third (16) axes.

7. The tool of claim 1 wherein at least one of said cutting sections (11,11') of said cutting portion and at least one of said clamping sections (14,14') of said clamping portion have interlocking tracks.

8. The tool of claim 7 wherein said interlocking tracks are curved.

9. The tool of claim 7 wherein said interlocking tracks in at least one position relative to each other are substantially concentric about a common, central axis (C).

10. The tool of claim 7 wherein said interlocking tracks include a pair of spaced-apart tracks (23) on at least one of said clamp section and said cutting section and at least one track (26) on the other of said clamping section and said cutting section with said one track positioned between said pair of spaced-apart tracks.

11. The tool of claim 10 wherein said pair of tracks are spaced apart a distance greater than the width of said one track wherein said one track can move laterally between said pair of tracks.

12. The tool of claim 11 wherein said tracks are curved.

13. The tool of claim 11 wherein said one track and said pair of tracks in at least one position relative to each other are substantially concentric about a common, central axis (C).

14. The tool of claim 1 wherein each cutting section (11,11') of said cutting portion and each clamping sections (14,14') of said clamping portion have tracks respectively interlocking with one another.

15. The tool of claim 1 wherein said clamping sections (14,14') in an open position face one another to receive the pipe therebetween and said clamping sections and said cutting sections (11,11') have interlocking tracks wherein movement of the handle sections (12,12') of said clamping portion away from each other about said second pivotal axis (10) moves said clamping sections (14,14') and said cutting sections (11,11') toward open positions thereof to receive the pipe.

16. The tool of claim 1 wherein said clamping sections in an open position face one another to receive the pipe therebetween and wherein movement of the handle sections of said clamping portion toward one another about said second pivotal axis moves said clamping sections toward one another about said second pivotal axis to a closed position to grip the pipe between said clamping sections.

17. The tool of claim 16 wherein said clamping portion has a mechanism (30) extending between the third member (8) of the clamping portion and the handle section (12) of the first member of the clamping portion, said mechanism being mounted to the third member for pivotal movement relative thereto about a fourth axis (32), said third pivotal axis (16) between said second (6) and third (8) members being on one side of a plane containing said second (10) and fourth (32) axes when said clamping sections are in said open position and on the other side of a plane containing said second and fourth axes when said clamping sections are in said closed position.

18. The tool of claim 16 wherein at least one of said clamping sections and at least one of said cutting sections have interlocking tracks wherein movement of one (12) of the handle sections of said clamping portion and one (9) of the handle sections of the cutting portion toward each other with the clamping sections in said open position moves said cutting sections toward the open position thereof.

19. The tool of claim 18 wherein each cutting section (11,11') of said cutting portion and each clamping sections (14,14') of said clamping portion have tracks respectively interlocking with one another.

20. The tool of claim 1 wherein the main body of each of said cutting sections has at least two cutting wheels mounted thereto.

21. The tool of claim 20 wherein said two cutting wheels on each cutting section are mounted substantially 90 degrees from each other about an axis.

22. The tool of claim 20 wherein said cutting wheels on the main bodies of said cutting sections are spaced substantially 90 degrees from each other about an axis with said cutting sections in at least one position relative to each other.

23. The tool of claim 1 wherein the pipe has outer (40) and inner (42) walls spaced from each other and at least one of said cutting wheels has a main body (39) and an annular blade (37) extending outwardly therefrom with sides (35) tapering down to a cutting edge (41), said cutting wheel further including a curved radius section (31) between the main body and said blade, said blade extending outwardly of said main body for a distance greater than the distance between the outer and inner walls of the pipe wherein said radius section (31) contacts and bevels the outer wall (40) of said pipe as the blade cuts through the pipe.

24. The cutting tool of claim 23 wherein said cutting wheel includes a radius section (31) adjacent each side (35) of said blade.

25. The cutting tool of claim 23 wherein said cutting wheel includes a radius section (31) adjacent each side (35) of said blade wherein said blade extends for a distance in a direction substantially perpendicular to the rotational axis (17) of said cutting wheel less than the distance between the outer (40) and inner (42) walls of the pipe, said tapering blade sides (35) making a substantially V-shaped cut in the pipe wherein said radius sections (31) contact and spread the sides (48) of said V-shaped cut in the pipe away from the tapering sides (35) of the blade before the cutting edge (41) of the blade cuts through the inner wall (42) of the pipe to thereby aid in preventing binding on the sides (35) of the blade by the sides (48) of the V-shaped cut in the pipe.

* * * * *